UNITED STATES PATENT OFFICE.

EDWARD E. SOMERMEIER, OF COLUMBUS, OHIO.

PROCESS OF PRESERVING WOOD.

1,082,658.  Specification of Letters Patent.  Patented Dec. 30, 1913.

No Drawing.  Application filed December 22, 1910.  Serial No. 598,697.

*To all whom it may concern:*

Be it known that I, EDWARD E. SOMERMEIER, a citizen of the United States, residing at Columbus, in the county of Franklin and State of Ohio, have invented certain new and useful Improvements in Processes of Preserving Wood, of which the following is a specification.

My invention relates to a process for the preservation of wood and other materials of vegetable or animal origin, as cotton, wool, silk, hemp, jute, leather, rubber, sisal, and other substances, and contemplates especially the use of compounds of arsenic for this purpose, the process being carried on by introducing the arsenic in solution by means of an appropriate solvent, the process being carried on in such a manner as to bring about the precipitation of all or of a portion of the arsenic in the interior of, or on the fibers of the material in a comparatively insoluble form.

The details of the process will be hereinafter set forth and the essential features thereof embodied in the claim.

The value of metallic antiseptics in the preservation of substances such as those enumerated has long been recognized, and salts of copper, zinc, mercury, and other metals have been in common use for many years, and at the present time it is generally recognized that the value of metallic preservatives is largely dependent upon three things, as follows: (1) The antiseptic property of the salt. (2) The completeness of the impregnation of the wood or other material. (3) The insolubility of the antiseptic in aqueous solution after impregnation.

Among the common antiseptics, mercuric chlorid, zinc chlorid, and copper sulfate occupy a high rank as regards antiseptic properties and ease of impregnation, but they are all rendered much less effective as permanent preservatives by their ready solubility in water. Many of the salts of arsenious and arsenic acids are highly antiseptic, and some of them, notably copper arsenite and lead arsenate, have been and are used extensively in spray mixtures by horticulturalists, gardeners, and others. The more antiseptic salts of arsenic compare favorably with mercuric chlorid zinc chlorid and copper sulfate as antiseptic preservatives, and practically all of them except those of the alkali metals are comparatively very insoluble in water; for example the arsenites and arsenates of lead, mercury, copper, aluminum, iron, nickel, manganese, zinc, calcium, barium, strontium, and magnesium are all comparatively insoluble in water, and they are in this respect therefore much superior to copper sulfate, mercuric chlorid and zinc chlorid as permanent preservatives. Because of their comparative insolubility in water, thorough impregnation of the wood or other material is correspondingly more difficult, and on this account their use as preservatives has been extremely limited.

My process of preservation is to introduce the constituents necessary to form insoluble antiseptic compounds into the substance to be preserved in a soluble form, and leave them there in a comparatively insoluble form.

My process of treatment is as follows: Treatment with the arsenic and the metal or base, dissolved in an alkaline solvent, and precipitation of the insoluble arsenic compound by volatilization, precipitation, or neutralization of the excess of solvent. The solution may contain approximately ¼ to 3% of one or of a mixture of two or more of the oxids, hydroxids or salts of copper, together with approximately ⅕ to 3% of arsenious oxid, dissolved in a suitable solution such as one of the following: (*a*) An aqueous solution of ammonia, containing approximately up to 3% of ammonia. (*b*) An aqueous solution of ammonium carbonate, containing approximately up to 8% of ammonium carbonate. Examples of salts and compounds of the metals which may be dissolved in the alkaline solutions in amounts from approximately ¼ to 3% are as follows: cupric oxid, hydroxid, carbonate, chlorid, acetate, nitrate or sulfate. A solution containing approximately ¼ to 3% of a mixture of two or more of these salts or compounds may be used. After treatment with the arsenic and copper, dissolved in solution (*a*) or (*b*) above, the excess of alkali may be volatilized by drying either in a kiln or in the open air, or the substance may be treated with an acid solution. In the treatment the composition of the compounds formed varies with the relative amounts of the constituents used, which amounts may be varied beyond the limits given if such variation may seem desirable or expedient. The compounds formed may be modified also by reactions produced by means of organic or mineral constituents present in the substance treated. Definite composition of the compounds formed is of no special importance so long as they are highly antiseptic and comparatively insoluble in water.

The treatment may be by any of the common processes, as, first, treatment by the vacuum, steaming and pressure process; second, treatment by simple steeping in a cold solution; third, treatment by steeping in a hot solution followed by steeping in a cold solution. The particular one of these methods which may be most desirable or expedient is dependent upon the cost of installing and operating the plant required to carry on the process, the quantity and kinds of the substance to be treated, and the use and conditions to which the same is to be subjected after treatment.

Instead of white arsenic, any of the soluble salts of arsenious acid may be used, as sodium, ammonium, and potassium arsenite or any of the soluble salts of arsenic acid may be used, the properties of the arsenates being practically the same as the arsenites.

What I claim is:

The process for preserving fibrous, organic materials of the kinds enumerated herein, consisting in treating said materials with a solution of one or more compounds of copper, together with arsenious oxid in solution in a suitable dilute alkaline solvent as specified herein.

In testimony whereof I affix my signature in the presence of two witnesses.

EDWARD E. SOMERMEIER.

Witnesses:
 DANA J. DEMOREST,
 CYRUS HOMER YOUNG.